(No Model.)
S. S. LUKENS.
SHAFT COUPLING.
No. 299,152. Patented May 27, 1884.
Fig. 1.
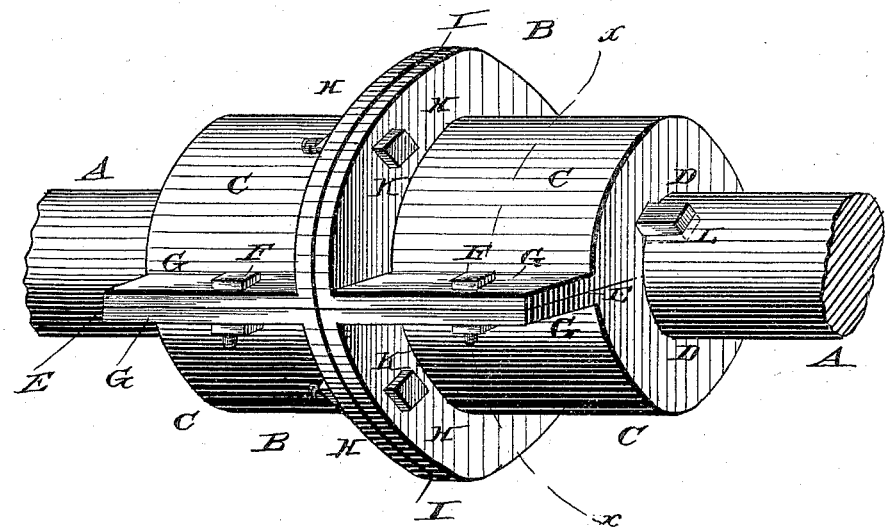
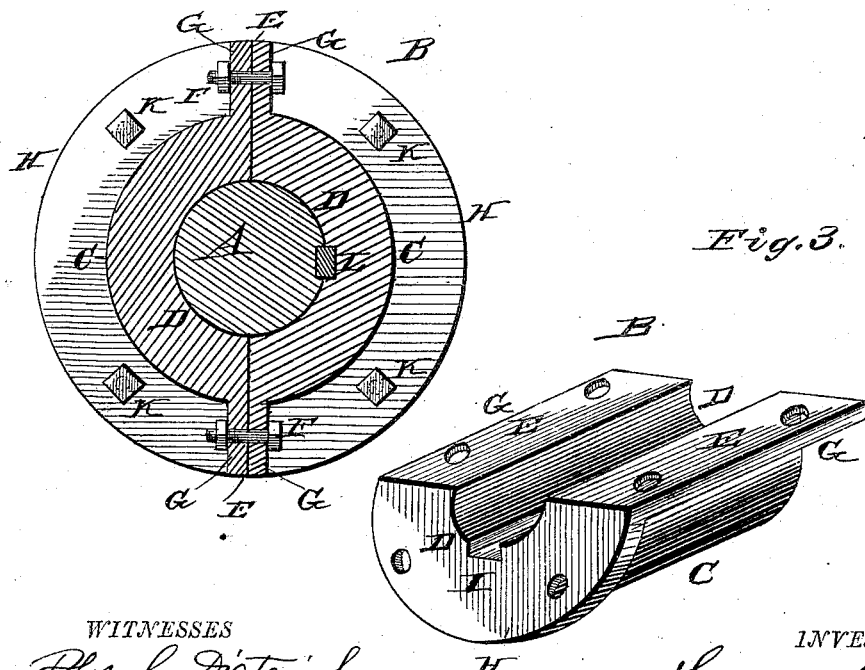
Fig. 2.
Fig. 3.
WITNESSES
Phil C. Dietrich
W. R. Keyworth
INVENTOR
Sirino S. Lukens
by Manahan & Ward, Attorneys.

UNITED STATES PATENT OFFICE.

SERINO S. LUKENS, OF ROCK FALLS, ILLINOIS.

SHAFT-COUPLING.

SPECIFICATION forming part of Letters Patent No. 299,152, dated May 27, 1884.

Application filed April 5, 1884. (No model.)

*To all whom it may concern:*

Be it known that I, SERINO S. LUKENS, a citizen of the United States, residing at Rock Falls, in the county of Whiteside and State of Illinois, have invented certain new and useful Improvements in Shaft-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention pertains to improvements in shaft-couplings, and refers especially to certain novel though simple mechanism for connecting the adjacent ends of different sections of an iron shaft, so as to render the same practically one continuous piece, and so that the same may be readily put up or taken down.

In the drawings, Figure 1 is an oblique side elevation of my invention in the position in which it is used. Fig. 2 is a transverse section of the same in the line $xx$ of Fig. 1. Fig. 3 is a view of one-fourth of the coupling detached.

A A, Fig. 1, are the sections of a shaft, the adjacent ends of which are inserted in the coupling.

B is the coupling, consisting of the four parts C, each of which parts is identical in size, shape, and function with the others. On the inner face of each part C is formed the semicircular recess D, fitted to conform to one-half of the transverse circumference of the shaft A. That portion of the part C which extends outwardly from the recess D, on each side of the latter, is formed into outward flanges G, having on their inner side a flat face, E, on the plane of a line drawn transversely through the center of the shaft A, which face E is fitted to lie closely against the corresponding face E on the part C on the opposite side of the shaft A. The parts C, whose inner faces E are contiguous, are held together by the bolts F, which pass through the flanges G, and are tightened and held by nuts on such bolts. Each part C is provided at its inner end with a semi-annular outwardly-extending flange, H, whose end face I is on the same transverse plane with the inner end of the part C. The end face I of each flange H, as well as the inner end of the part C, is finished to fit closely the corresponding and contiguous portions of the other part C on the same side of the shaft A. The parts C which lie on the same side of the shaft A are held together by nutted and threaded bolts K, which pass transversely through the abutting semi-annular flanges H. Thus the four parts C are held together, so as to form one integral piece, the sections of the shaft A being inserted, respectively, into each end of the coupling B, and resting in the recesses D, which latter, when the four parts C are brought together, as aforesaid, form a circular hole extending longitudinally through the center of the coupling B. Each part C, as will be readily seen, has an inner and an end dressed face; and in boring the recess D the coupling B is put together with a sheet of heavy paper about one thirty-second of an inch thick between the contiguous faces of the parts C, and when such boring is completed (having the same diameter as the shaft to be coupled) the paper is removed, and thus sufficient gain allowed to compress the coupling B tightly upon the shaft A.

L is an iron key seated partially in the inner circumference of the coupling B, and partially in the outer circumference of the contiguous portion of the shaft A, and which, being tightly driven into such seat, assists in holding the shaft A from turning in the coupling B.

My invention is cheaply and easily made, all of the parts C being cast from the same pattern, and from its simplicity and strength not at all likely to get out of repair.

The advantage of four parts C over two is in convenience in manufacture and in taking down and putting up the shaft, as the connection is made after three parts are in place, whereby a seat is provided for the next section.

What I claim as my invention, and desire to secure by Letters Patent of the United States, is—

The combination of the shaft A, bolts F and K, and coupling B, the latter composed of the four corresponding parts C, provided with faces E and J, substantially as shown, and for the purpose described.

In testimony whereof I affix my signature in presence of two witnesses.

SERINO S. LUKENS.

Witnesses:
FRED LUKENS,
WALTER N. HASKELL.